(No Model.) 4 Sheets—Sheet 1.
D. HALPIN.
STEAM GENERATOR.
No. 513,922. Patented Jan. 30, 1894.
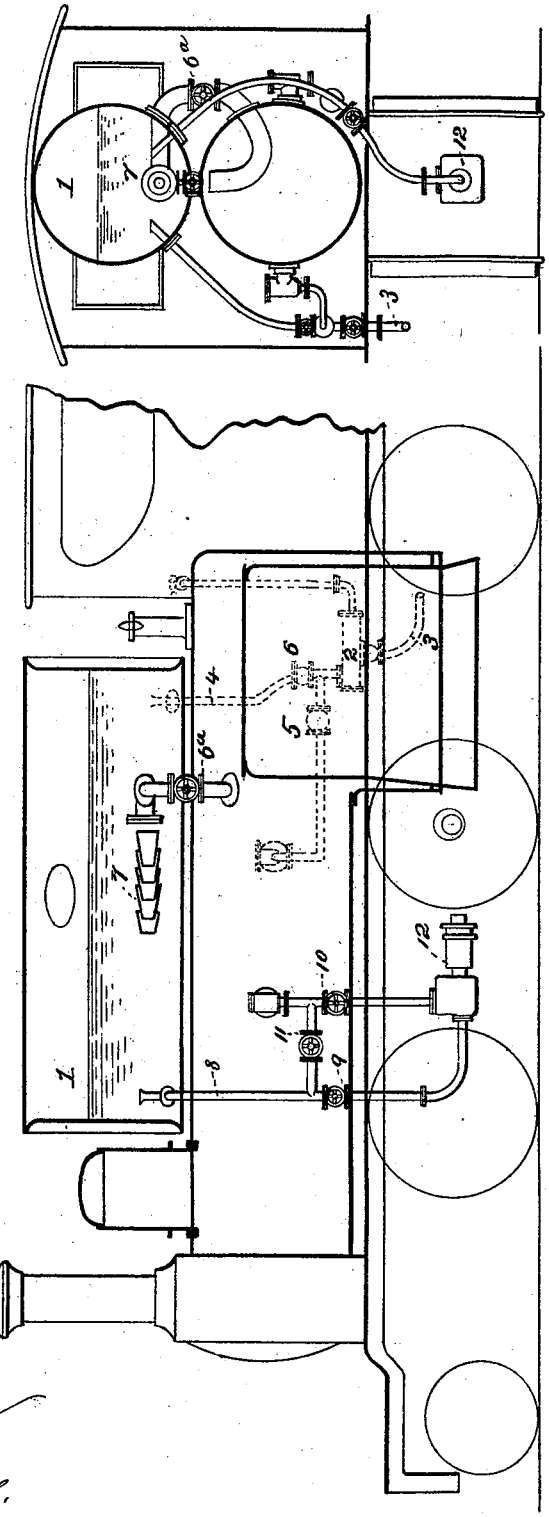

(No Model.)  4 Sheets—Sheet 2.

D. HALPIN.
STEAM GENERATOR.

No. 513,922. Patented Jan. 30, 1894.

Fig. 4.

Fig. 3.

Witnesses:
J. B. McGirr.
T. V. McCleary.

Inventor:
Druitt Halpin
by Connolly Bros.
attys.

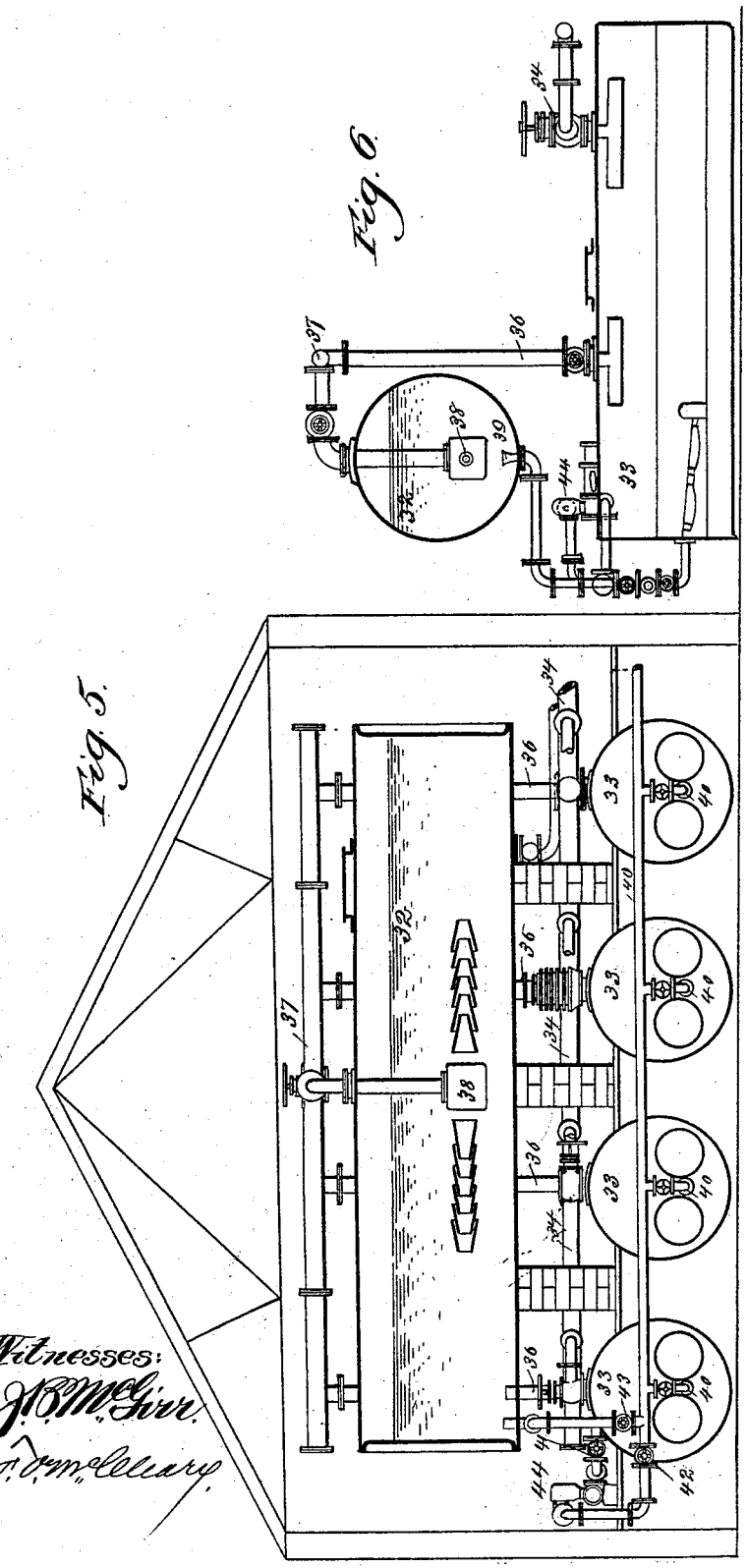

(No Model.) 4 Sheets—Sheet 4.
D. HALPIN.
STEAM GENERATOR.
No. 513,922. Patented Jan. 30, 1894.
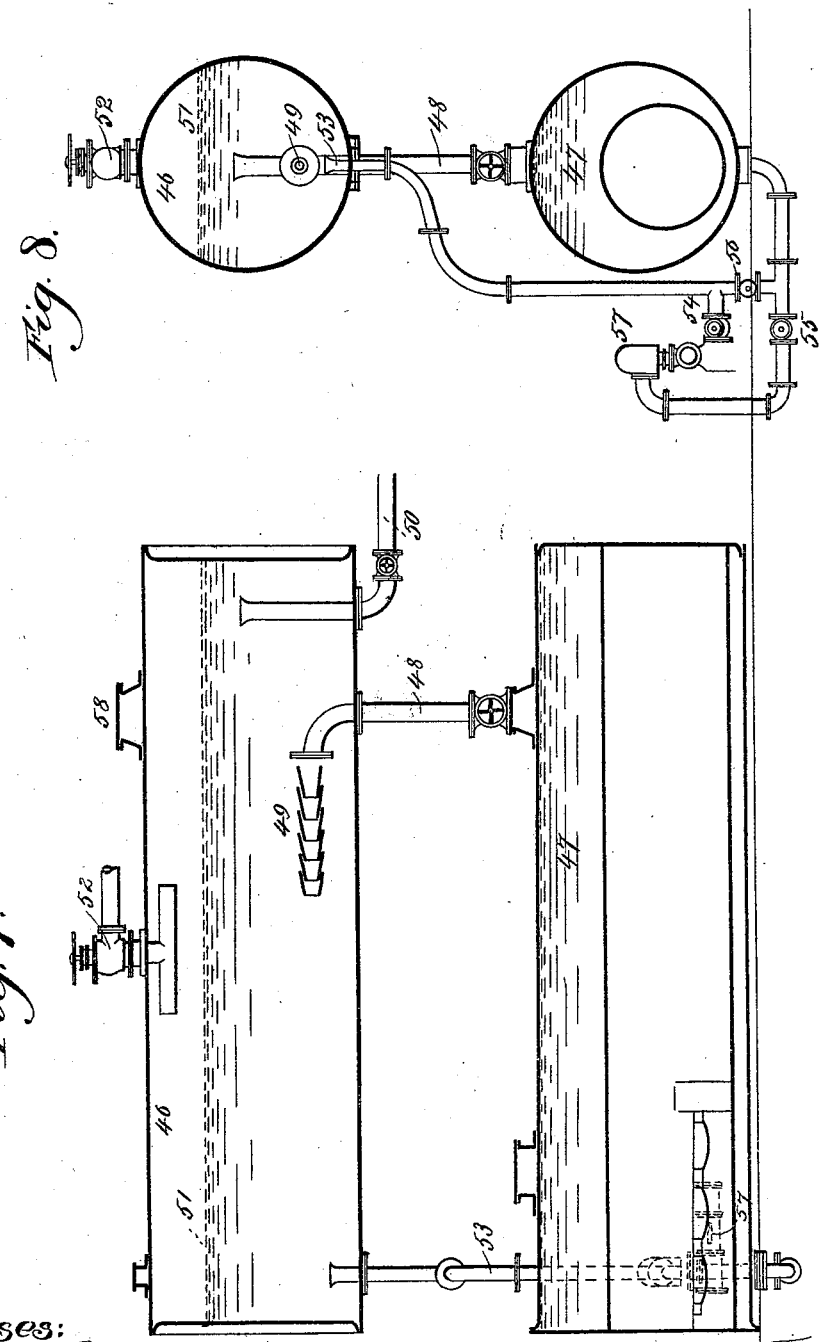

UNITED STATES PATENT OFFICE.

DRUITT HALPIN, OF LONDON, ENGLAND.

STEAM-GENERATOR.

SPECIFICATION forming part of Letters Patent No. 513,922, dated January 30, 1894.

Application filed June 3, 1892. Serial No. 435,420. (No model.) Patented in England January 7, 1892, No. 363.

*To all whom it may concern:*

Be it known that I, DRUITT HALPIN, a subject of the Queen of Great Britain, residing at London, England, have invented certain new and useful Improvements in Steam-Generators, (patented to me in Great Britain January 7, 1892, No. 363;) and I do hereby declare the following to be a full, clear, and exact description of the invention, reference being had to the accompanying drawings, which form part of this specification.

My invention has relation to steam generators, and has for its object the provision of novel apparatus for generating steam whereby, firstly, I am enabled with an ordinary boiler of comparatively small size and power to produce a large store of motive power of which a large or a comparatively small portion may be utilized at one time without affecting the economical working of the steam generator; and secondly, I am enabled to effectually purify the water before it enters the steam generator proper and thus preserve the latter from all injury from deposits.

My invention consists in the novel construction, combinations and arrangements of parts hereinafter described and claimed.

In carrying my invention into effect, I employ in combination with any suitable known form of steam generator a reservoir of large capacity placed in any convenient position and I connect such reservoir with the steam generator by a pipe reaching up to a certain height above the bottom thereof, so that, assuming the reservoir to be partly filled with water, the steam generator will be entirely so filled, while the steam space will be formed by the upper part of the reservoir. I connect the lower part of the reservoir also with the lower part of the steam generator, by a pipe so that the water will descend into the steam generator from the reservoir through the last named connection, while the steam and hot water produced in the steam generator will rise into the reservoir through the first named connection. Furthermore, I introduce the feed water, which may be previously heated to any required degree, into the lower part of the reservoir, and I take off the steam required for consumption from the steam space of the latter. Thus the action of the apparatus so arranged will be as follows: The feed water, in entering the reservoir charged with hot water and steam, will deposit practically the whole of its impurities in the bottom thereof, so that the steam generator will remain practically free from deposit. The steam generator will be continuously worked to its full power, and consequently in the most economical manner possible, and such economy will be largely increased by the absence of all deposits which in ordinary tubular steam generators prevent their being worked at a high rate of duty. The reservoir, receiving and storing up in its large capacity the whole of the steam generated in the generator, is rendered capable of giving off either continuously a power equal to that produced by the steam generator or at times it may give off considerably less than that power, and at other times considerably more, as not only the power stored in the reservoir but at times also in addition a certain proportion of the power generated by the generator can be taken off. The reservoir may either be placed at a higher level or at the same or at a lower level than the steam generator, and the before described circulation of the water may be assisted or produced by a pump. Also, instead of having the steam generator entirely filled with water as described, the parts may be so arranged that steam spaces are provided both in the reservoir and in the steam generator. Also, two or more separate steam generators might communicate with one reservoir or two or more reservoirs with one generator.

In the accompanying drawings illustrating my invention, Figure 1 is a vertical longitudinal sectional view of a locomotive boiler. Fig. 2 is a vertical transverse sectional view of the same. Fig. 3 is a vertical longitudinal sectional view of a stationary steam generator. Fig. 4 is a vertical transverse sectional view of the same. Fig. 5 is a vertical transverse sectional view of a steam generator comprising a battery of boilers connected with a single reservoir. Fig. 6 is a vertical longitudinal sectional view of the same. Fig. 7 is a vertical longitudinal sectional view of a modified form of apparatus; and Fig. 8 is a vertical transverse sectional view of the same.

Figs. 1 and 2 show the detail arrangement of my invention as applied to locomotives, Fig. 1 being a longitudinal section through the engine. Fig. 2 is a cross section.

In these figures I show the thermal storage receiver which in this case consists of a cylindrical shell placed on the top of the boiler, but the form of the receiver may be altered to any convenient shape, or instead of being placed on the top of the boiler can be placed in the tender. Water is forced into the receiver by means of the injector 2 supplied with water from the pipe 3 from the tender, or water-tanks, of the engine, and the water is delivered direct into the receiver by means of the pipe 4, the cock 5 being then closed. If it is wished to use this same injector for directly feeding the boiler the cock 5 is opened and the cock 6 is closed. In order to work the thermal storage receiver, steam is admitted into it through the cock 6ª, and the distributing nozzle 7, and if the pressure in the receiver is equal to that in the boiler the water can be fed from the receiver into the boiler through the pipe 8, the cocks 9 and 10 being then closed and cock 11 left open; or should the pressure in the receiver be a little less than that in the boiler, the boiler can be fed from the receiver by means of the ordinary feed pump 12 driven by an eccentric on one of the wheels, or axles, of the engine. In this case the cock 11 is closed and the cocks 9 and 10 are opened. In working this thermal storage system on locomotives, advantage is of course always taken when the boiler is not doing its maximum work, so as to produce as much spare steam as possible and drive it into the receiver, thus storing up heat which is to be afterward utilized when the engine has to give forth its full power.

Figs. 3 and 4 show an arrangement of my invention for working stationary engines. 13 is shown as a locomotive boiler, but may be any approved type of boiler, and 14 in this case is the receiver. In this system now to be described steam may be taken directly from the boiler through the steam pipe 15 for working the engine, or heat may be stored in the receiver and steam taken from it to work the engines by means of the pipe 16. 17 is the pipe for filling the receiver with water, and 18 is the pipe for taking the steam from the boiler 13 and putting it into the receiver 14, the steam being thoroughly mixed with the water contained in the receiver by means of the nozzle 19. 20 is the pipe taking water from the receiver to the boiler, the flow of the water being effected in this case by means of the feed pump 21 which delivers water through the pipe 22. In this case the cock 23 on Fig. 4 is closed or if the pressure in the receiver is equal to that in the boiler so that the pump may be dispensed with, the cock 23 is opened and 24 is closed, and water is run into the boiler directly through the pipe 25. The flow in this case is effected by difference of head. 26 shows an injector by means of which water can either be delivered into the receiver by the pipe 27, the cock 29 being closed and the cock 28 being open, or water can be delivered directly into the boiler by the same injector through the pipe 30, the cock 28 being closed and the cock 29 being open. 31 shows a manhole by means of which the receiver can be entered to clean out the dirt deposited in it, which dirt will be deposited on the application of heat, and it is to be noticed that the suction pipe 20 feeding water from the receiver to the boiler is taken some distance above the bottom of the receiver.

Figs. 5 and 6 show how I use this arrangement in another way in connection with stationary boilers. Taking the case of an existing battery of four boilers working an engine and unable to produce sufficient steam for it, cases may occur in which there is not room to put in more boilers and if it were possible to put them in there is not sufficient available chimney power to drive them. In this case I place one or more receivers over the boilers or in any other convenient available space and put water into the receivers, and work the boilers full power (the engine at this time not being at work) for a sufficient length of time to bring the temperature and pressure of the water in the receivers to the same temperature and pressure as the water in the boilers. When the engine is at work I am enabled by this means to feed the boilers with water at the same temperature as the water they contain, and thus utilize the furnaces for the purpose of evaporation alone, and not evaporation in addition to heating the feedwater. 33 shows the boilers which in this case are Lancashire, but may be any approved type. 34 shows the main steam pipe supplying the engine with steam. 35 shows the water pipe supplying the receiver with water. 36 shows separate pipes connected to the main pipe 37 which supplies steam to the receiver through the nozzle 38. The water is drawn off from the receiver through the pipe 39 and passes directly into the boiler by means of the feed-pipe 40, the cocks 41 and 42 closed and the cock 43 being open or else the cock 43 closed and cocks 41 and 42 are opened when the water is forced into the boiler by means of the feed-pump 44. A manhole 45 is placed in the receiver for cleaning out the deposited dirt, it being noted that the pipe 39 taking the feedwater from the receiver to the boiler is placed some distance above the bottom of the receiver.

Figs. 7 and 8 show the application of my system where no separate water level is maintained in the boiler containing the furnaces, and warming the water. 46 is the receiver and 47 the boiler, of any approved type. Water is heated and is driven into the receiver by means of the pipe 48 passing out through the nozzle 49. Water is fed into the receiver by means of the pipe 50, reaching some distance above the bottom of the receiver. The steam is liberated at the free water level 51 in the receiver and is taken off by the pipe 52 to work the engine. 53 shows the pipe conveying water from the receiver to the boiler, and it either passes direct to the boiler if the cocks 54 and 55 are closed and the cock 56 open, or if 56 is closed and 54 and 55 open it is forced from the receiver into the boiler by means of the steam pump 57. 58 is a manhole for entering the receiver to clear away the dirt deposited from the water as before described. The thermal storage is here effected in the receiver 46 which supplies steam to the engine.

Having described my invention, I claim—

1. The method of working steam generators which consists in continuously generating in the steam boiler steam in excess of what is usually demanded for heating or working purposes, conducting the thermal products of the boiler upwardly to a storage reservoir and taking the supply of steam for the engine directly therefrom, causing a downward circulation of the water from the reservoir to the boiler, storing up in the reservoir the excess of steam over that required for normal working purposes and, at intervals of greater demand and for prolonged periods, reinforcing the supply from the reservoir by the increment in the reservoir.

2. In steam generators, the combination with a boiler of a reservoir arranged above the boiler, a circulating pipe leading from the boiler to the water space of the reservoir, a second circulating pipe leading from the water space of the boiler to the water space of the reservoir, a water supply pipe leading from a source of supply directly to the reservoir and a pipe conveying steam directly from the reservoir to an engine, substantially as described.

3. In steam generators, the combination with a boiler and a reservoir arranged above the boiler, of a circulating pipe leading from the water space of the boiler to the water space of the reservoir, a second circulating pipe leading from the steam space of the boiler to the water space of the reservoir, a third pipe conveying steam directly from the reservoir to the engine and a fourth pipe conveying water from a source of supply directly to both the boiler and reservoir, substantially as described.

4. In a steam generator, the combination with a boiler and a furnace, of a reservoir arranged in the vicinity of the boiler, a pipe leading from the steam space of the boiler, to the water space of the reservoir, a pump, a pipe leading from the water space of the reservoir to said pump, a pipe leading from said pump to the water space of the boiler and a pipe connecting the pipes leading to and from the pump, all the said pipes being provided with cocks, substantially as described.

In testimony that I claim the foregoing I have hereunto set my hand this 3d day of May, 1892.

DRUITT HALPIN.

Witnesses:
FRED. A. YERBURY,
ALFRED GROVES.